(12) United States Patent
Silverman et al.

(10) Patent No.: US 10,873,947 B2
(45) Date of Patent: *Dec. 22, 2020

(54) INTERNET OF THINGS (IOT) DEVICE LOCATION TRACKING USING MIDAMBLES

(71) Applicant: Cisco Technology, Inc., San Jose, CA (US)

(72) Inventors: Matthew Silverman, Shaker Heights, OH (US); Paul J. Stager, Akron, OH (US); Xu Zhang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/287,388

(22) Filed: Feb. 27, 2019

(65) Prior Publication Data

US 2020/0275426 A1 Aug. 27, 2020

(51) Int. Cl.
*H04W 4/80* (2018.01)
*H04W 72/04* (2009.01)
(Continued)

(52) U.S. Cl.
CPC ........ *H04W 72/048* (2013.01); *H04B 7/0404* (2013.01); *H04B 17/318* (2015.01);
(Continued)

(58) Field of Classification Search
CPC ............. H04W 72/048; H04W 72/042; H04W 72/0453; H04W 7/0404; H04W 17/318; H04W 5/0044; H04W 67/12
See application file for complete search history.

(56) References Cited

U.S. PATENT DOCUMENTS

2004/0266374 A1* 12/2004 Saed .................... H04B 7/0811
455/134
2012/0258669 A1* 10/2012 Honkanen ................ G01S 3/46
455/67.11

(Continued)

OTHER PUBLICATIONS

Cho, et al.., "Performance Evaluation of V2V/V2I Communications: The Effect of Midamble Insertion", Wireless VITAE'09, pp. 793-797, 2009, IEEE.
(Continued)

*Primary Examiner* — Mewale A Ambaye
(74) *Attorney, Agent, or Firm* — Behmke Innovation Group LLC; James M. Behmke; James J. Wong

(57) ABSTRACT

In one embodiment, a technique for Internet of Things (IoT) device location tracking using midambles is provided. A first wireless device in connection with an antenna array may receive one or more first data symbols of a data payload from a second wireless device using a first antenna state that assigns a radio path, used for location estimation, to a first antenna of the antenna array. Subsequent to identifying a first midamble of the data payload, the first wireless device may change the first antenna state to a second antenna state that assigns the radio path to a second antenna of the antenna array. The first wireless device may receive one or more second data symbols of the data payload using the second antenna state. The first wireless device may determine a location of the second wireless device based on location information determined using the radio path.

20 Claims, 12 Drawing Sheets

(51) Int. Cl.
H04B 7/0404 (2017.01)
H04B 17/318 (2015.01)
H04L 5/00 (2006.01)
H04L 29/08 (2006.01)

(52) U.S. Cl.
CPC ......... *H04L 5/0044* (2013.01); *H04W 72/042* (2013.01); *H04W 72/0453* (2013.01); *H04L 67/12* (2013.01)

(56) References Cited

U.S. PATENT DOCUMENTS

| | | |
|---|---|---|
| 2012/0327871 A1 | 12/2012 | Ghosh et al. |
| 2017/0131381 A1 | 5/2017 | Malik et al. |
| 2017/0134900 A1* | 5/2017 | Malik .................. H04B 7/0682 |
| 2017/0135061 A1* | 5/2017 | Park ..................... G01S 5/0289 |
| 2017/0212210 A1* | 7/2017 | Chen ......................... G01S 5/06 |
| 2018/0084371 A1* | 3/2018 | Scagnol ................. H04W 4/80 |

OTHER PUBLICATIONS

Makki, et al., "Survey of WiFi Positioning using Time-Based Techniques", Computer Networks, 88, Sep. 9, 2015, pp. 218-233, Elsevier.

Tan, et al., "Effect of the Leakage Between Elements on the Measured Capacity of Indoor Multiple-input Multiple-output Channels", The 13th IEEE International Symposium on Personal, Indoor and Mobile Radio Communications, vol. 2., pp. 572-576, 2002, IEEE.

Zhao, et al., "Channel Estimation Schemes for IEEE 802.11p Standard", IEEE Intelligent transportation systems magazine, pp. 39-49, 2013, IEEE.

* cited by examiner

FIG. 6A

| ANTENNA STATE | MIDAMBLE | ANTENNA CONNECTED TO EACH RADIO PATH ||||
|---|---|---|---|---|---|
| | | A 604 | B 606 | C 608 | D 610 |
| 1 602 | 1 600 | 1 | 2 | 3 | 4 |
| 2 616 | 2 614 | 5 | 6 | 7 | 8 |

612 → (column above 4)
618 → (column above 8)

FIG. 6B

| ANTENNA STATE | MIDAMBLE | ANTENNA CONNECTED TO EACH RADIO PATH ||||
|---|---|---|---|---|---|
| | | A | B | C | D |
| 1 | 1 | 1 | 2 | 3 | 4 |
| 2 | 1 | 1 | 2 | 5 | 6 |
| 3 | 2 | 7 | 8 | 9 | 10 |
| 4 | 2 | 7 | 8 | 11 | 12 |

620 (braces rows 1–2), 622 (braces rows 3–4)

US 10,873,947 B2

INTERNET OF THINGS (IOT) DEVICE LOCATION TRACKING USING MIDAMBLES

TECHNICAL FIELD

The present disclosure relates generally to wireless communications, and, more particularly, to Internet of Things (IoT) device location tracking using midambles.

BACKGROUND

Wireless networks are becoming increasingly ubiquitous, with many businesses, schools, and public areas now offering wireless connectivity to authorized users and to guests. With the increasing popularity of wireless networks, the number of different types of wireless clients and wireless protocols is also rapidly increasing. For example, personal devices now include cellular phones, tablets, wearable devices (e.g., smart watches, head-mounted displays, etc.), while wireless protocol standards (e.g., 802.11ax, 802.11ay, etc.) are under continued development by groups like the Institute of Electrical and Electronics Engineers (IEEE).

Features have been introduced in the wireless protocol standards, including channel estimation, spatial stream support (e.g., multiplexing), etc. Notably, location estimation support has also been introduced, such that a device (e.g., an access point) may track a location of another device (e.g., a client device) using techniques such as angle or arrival (AoA), time of flight (ToF), etc. Smaller devices, for example, Internet of Things (IoT) devices, that tend to have poor antenna patterns, lack omni-directional antennas, and/or are constantly moving, pose challenges to implementing these features. Particularly, location tracking of smaller devices may be challenging due to multipath and/or constantly changing channels (used for transmission(s)).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6B illustrate simplified example antenna states; and

DESCRIPTION OF EXAMPLE EMBODIMENTS

Overview

Figure 1A:
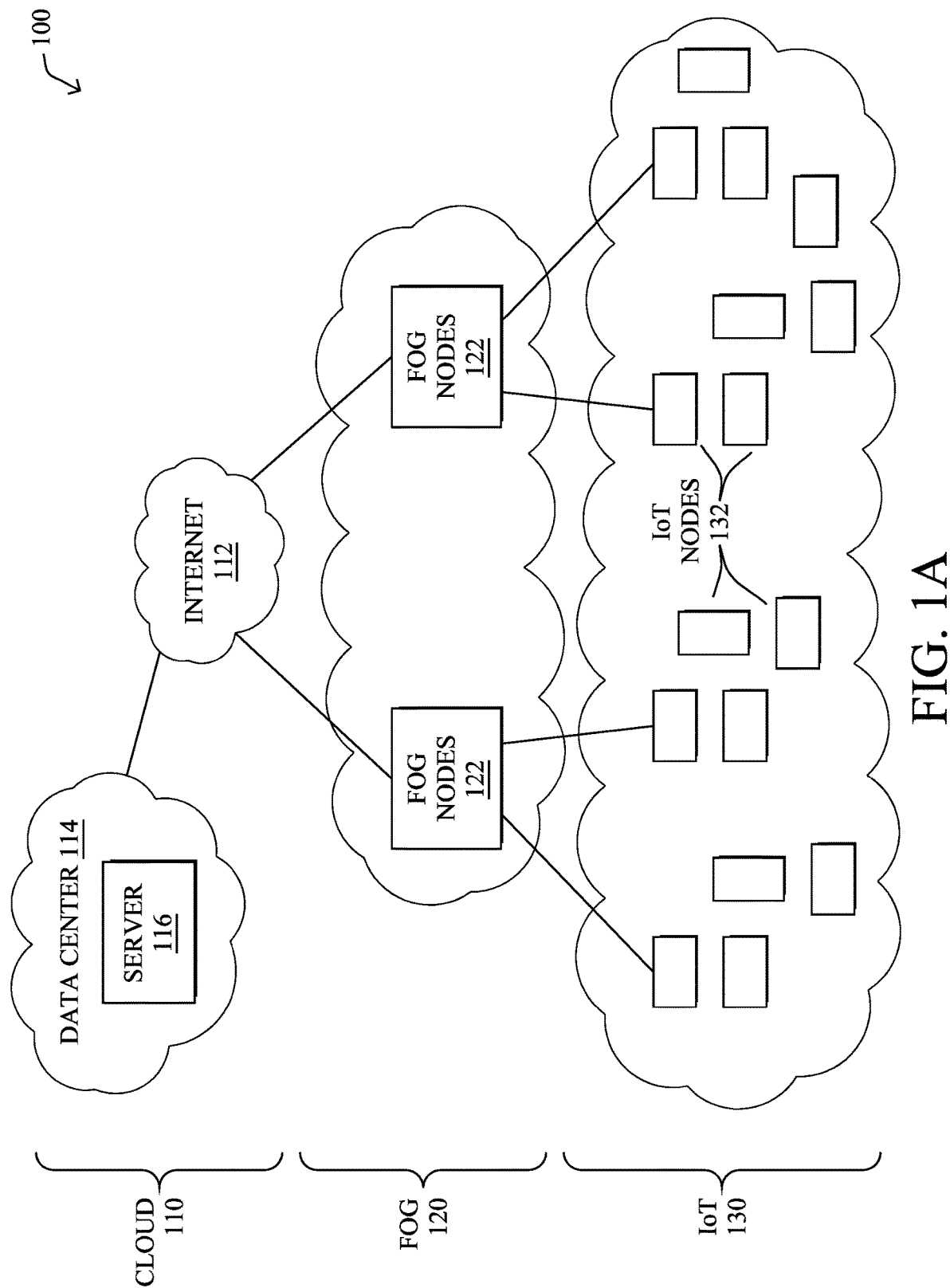
FIGS. 1A-1C illustrate an example communication network.

In one embodiment, a technique for Internet of Things (IoT) device location tracking using midambles is provided. A first wireless device in connection with an antenna array may receive one or more first data symbols of a data payload from a second wireless device using a first antenna state. The first antenna state assigns a radio path, used for location estimation, to a first antenna of the antenna array. Subsequent to identifying a first midamble of the data payload, the first wireless device may change the first antenna state to a second antenna state. The second antenna state assigns the radio path to a second antenna of the antenna array. The first wireless device may receive one or more second data symbols of the data payload from the second wireless device using the second antenna state. The first wireless device may determine a location of the second wireless device based on location information determined using the radio path.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, high bit error rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or hierarchy of layers from local networks (e.g., IoT networks) to the cloud (e.g., centralized and/or shared resources, as will be understood by those skilled in the art). That is, generally, fog computing entails using devices at the network edge to provide application services, including computation, networking, and storage, in close proximity to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple peer-to-peer and hierarchical layers of fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT layer 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Figure 1B:
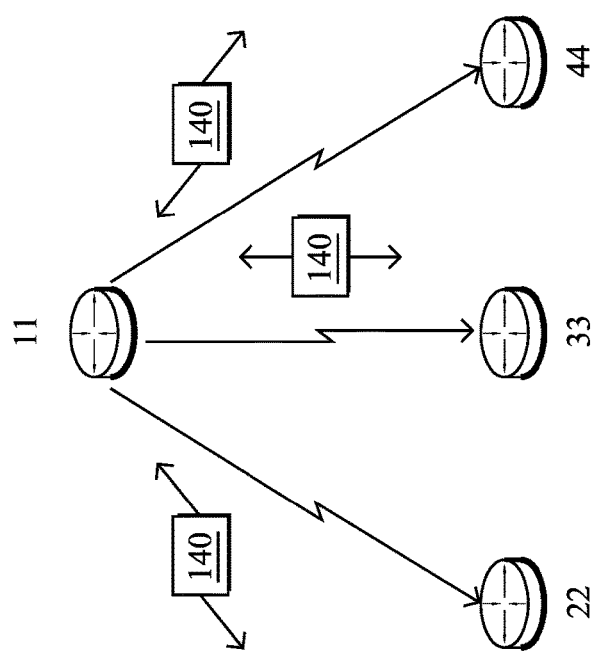
Figure 1B:
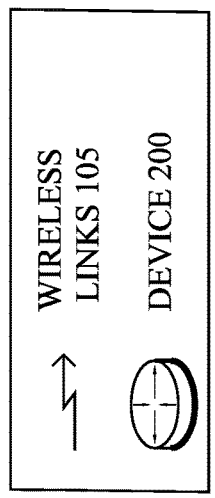

FIG. 1B is a schematic block diagram of an example (and vastly simplified) portion of computer network 100 (e.g., wireless connectivity) illustratively comprising nodes/devices 200 (e.g., labeled as shown, "11," "22," "33," and "44") interconnected by wireless communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the computer network 100, and that the view shown herein is for simplicity (particularly, that while routers are shown, any wireless communication devices 11-44 may be utilized).

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, RF, etc.) over wireless/RF links 105. Note that the communication may, in certain embodiments, be based on dual PHY links such as, for example, RF links and wired/PLC links, and the view shown herein in simplified for illustration. As used herein, PHY refers to the physical layer of the OSI model. In this context, a protocol consists of a set of rules defining how the nodes interact with each other.

Figure 1C:
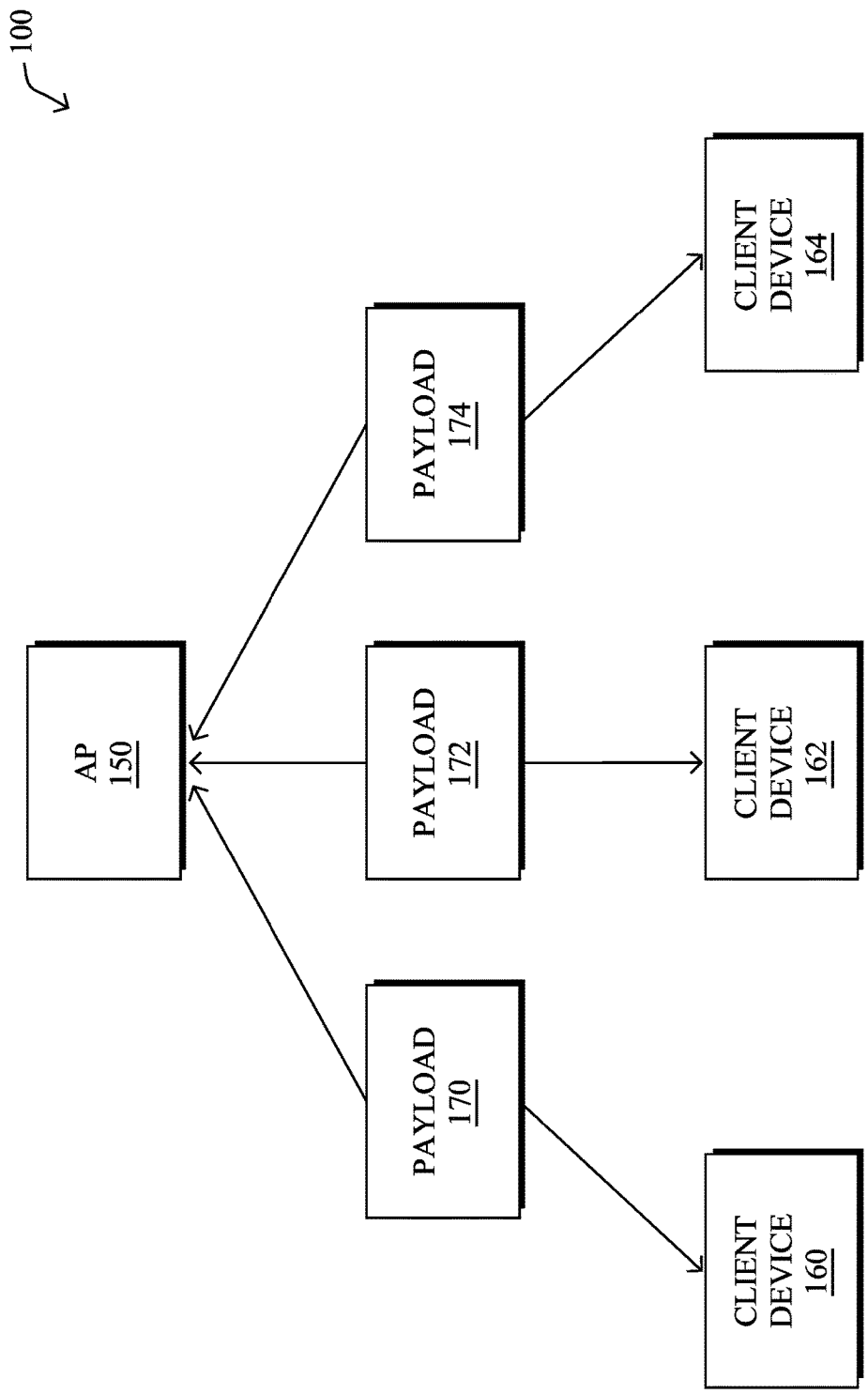

FIG. 1C illustrates an alternative view of the portion of the computer network 100 in greater detail, according to various embodiments. In one embodiment, for example, the node/device labeled as "11" in FIG. 1B may comprise an access point (AP) 150 that, in accordance with IEEE 802.11 communication standards, communicates with other nodes/devices (labeled as shown, "22," "33," and "44" in FIG. 1B) that comprise client devices 160-164. In particular, the AP 150 and the client devices 160-164 may include one or more communications antennas. The one or more communications antennas may be any suitable type of antennas corresponding to, for example, the IEEE 802.11 communication standards. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component(s) to transmit and/or receive signals, such as communications signals among the AP 150 and the client devices 160-164.

In one embodiment, the AP 150 and the client devices 160-164 may be configured to perform directional transmission and/or directional reception in conjunction with wirelessly communicating in a wireless network. Such directional transmission and/or reception can be performed using a set of multiple antenna arrays (e.g., DMG antenna arrays or the like). Each of the multiple antenna arrays may be used for transmission and/or reception in a particular respective direction or range of directions. The AP 150 and the client devices 160-164 be configured to perform any given directional transmission a) towards one or more defined transmit sectors and/or b) from one or more defined receive sectors. Additionally, MIMO beamforming in the computer network 100 may be accomplished using radio frequency (RF) beamforming and/or digital beamforming. For example, the AP 150 and the client devices 160-164 may be configured to use all or a subset of its one or more communications antennas to perform MIMO beamforming.

The AP 150 and the client devices 160-164 may include any suitable radio component(s) for transmitting and/or receiving RF signals in a bandwidth and/or channel corresponding to the communications protocols utilized by the AP 150 and the client devices 160-164. The radio component(s) may include hardware and/or software to modulate and/or demodulate communications signals according to pre-established transmission protocols. The radio component(s) may further have hardware and/or software instructions to communicate via one or more IEEE 802.11 communication standards. For example, the radio component(s), in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). In another example, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component(s) may include any known receiver and baseband suitable for communicating via the communications protocols. Further, the radio component(s) may include a low noise amplifier (LNA), additional signal amplifiers, an analog-to-digital (A/D) converter, one or more buffers, digital baseband(s), switches, etc.

In some embodiments, the AP 150 and the client devices 160-164 may send and/or receive 802.11-based data payloads 170-174 among each other. In general, the AP 150 and the client devices 160-164 can utilize the data payloads 170-174 to send and/or receive data between the AP 150 and the client devices 160-164. For example, the data payloads 170-174 may comprise a high efficiency (HE) PHY protocol data units (PPDUs) for use in either uplink or downlink scenarios, as defined in the IEEE 802.11ax standard. The AP 150 may trigger the client devices 160-164 to send PPDUs by sending, for example, a trigger frame to the client devices 160-164.

Figure 2:
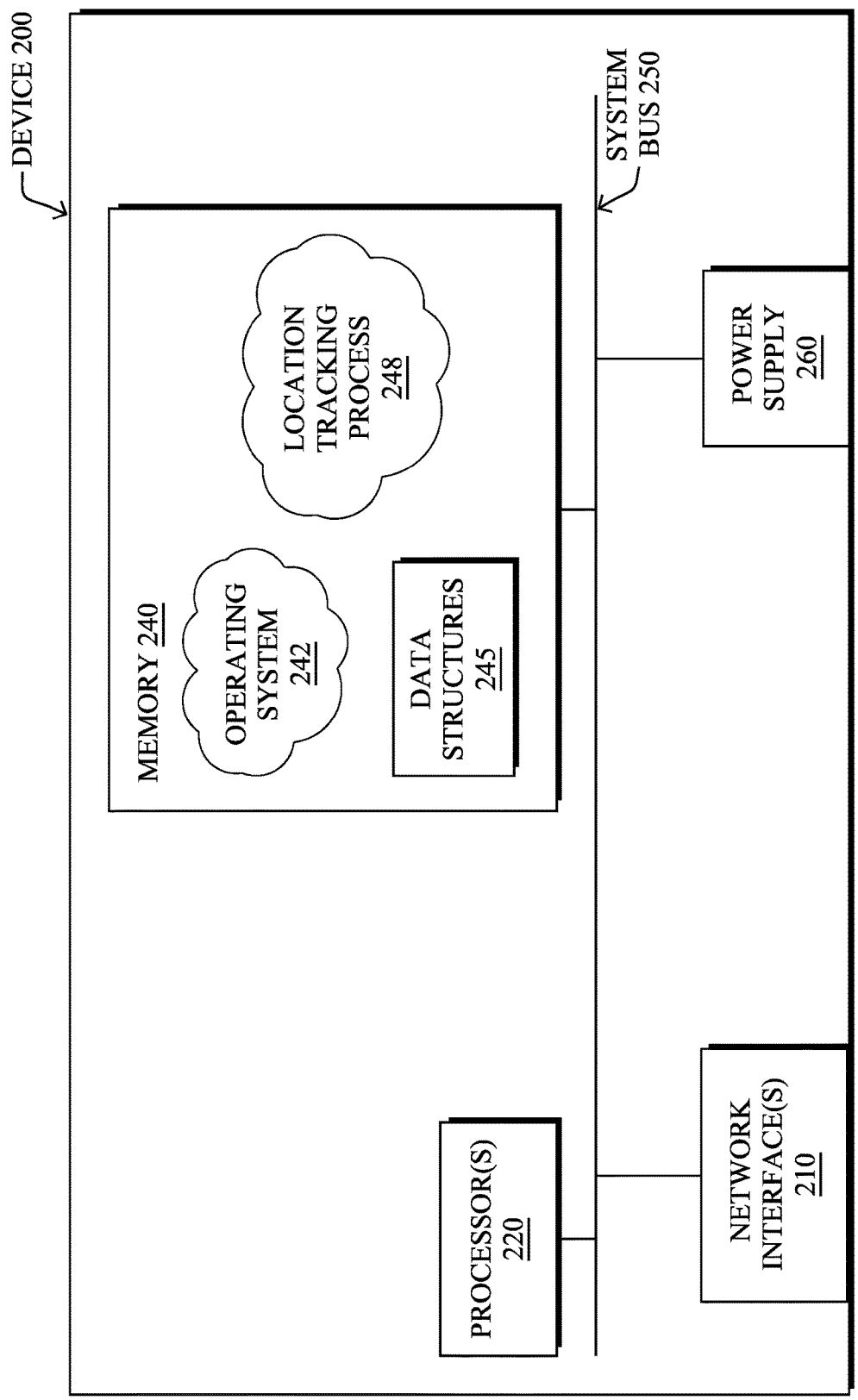
FIG. 2 illustrates an example network device/node.

FIG. 2 is a schematic block diagram of an example computing device/node (e.g., an apparatus) 200 that may be used with one or more embodiments described herein e.g., as any of the devices shown in FIGS. 1A-1C above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, for example, wireless and wired/physical connections, and that the view herein is merely for illustration. Further, the network interface(s) 210 may include the antennas and/or radio components described herein above for wireless communications (e.g., according to one or more 802.11 communication standards).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative location tracking process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Improved IoT Device Location Tracking Using Midambles

As noted above, smaller devices, for example, IoT devices, that tend to have poor antenna patterns, lack omni-directional antennas, and are constantly moving, pose challenges to implementing features of wireless protocol standards. One approach to addressing devices that are in motion and communicate in multipath channels introduces "midambles" that are symbols meant for channel re-estimation into data payloads. Specifically, as defined in IEEE 802.11ax, midambles are primarily used for improving packet reception by devices for packets received from moving devices. To this end, midambles may be inserted throughout data payloads (e.g., PPDUs) when devices that are sending the payloads are in motion and the multipath channel is dynamically changing at a rate fast enough to cause performance issues over the life of the data payloads.

As also noted above, location tracking of smaller devices may be challenging due to multipath and/or constantly changing channels (used for transmission(s)). The use of midambles as described in wireless protocol standards (e.g., IEEE 802.11ax), however, does not address mitigation of location tracking accuracy errors due to multipath for fast moving devices.

The techniques herein, however, enable improved IoT device location tracking using midambles. That is, while midambles are conventionally used by devices for equalizing of any data symbol in a data payload (e.g., a PPDU) based on a channel estimate from a recently processed midamble, the midambles may also be used according to the techniques herein to improve location accuracy, latency, update rates, and/or battery life for wireless devices. In particular, the midambles may be used herein to enable switching of radio paths during the reception of a data payload.

As will described in a greater detail below, a wireless device, which receives a data payload that includes midambles from a device, may include an antenna array. The wireless device may switch among antenna states (that assign radio paths to particular antennas of the antenna array) when it decodes a midamble as it receives the data payload. Switching among the antenna states enables capture of RF and/or baseband (BB) location information used for accurate location estimation. Doing so enables receive (Rx) diversity and preservation of Rx robustness for location estimation (or tracking) techniques, especially in situations where a receiving device has more antennas than radio paths (for receiving the data payload). For example, for each of the antenna states, a phase may be estimated and used in angle of arrival (AoA) location. In another example, a Rx time of arrival (TOA) timestamp may be computed for time-based location. In yet another example, a received signal strength indicator (RSSI) may be averaged over many antennas for a more accurate estimate.

Specifically, according to one or more embodiments of the disclosure as described in detail below, a first wireless device in connection with an antenna array may receive one or more first data symbols of a data payload from a second wireless device using a first antenna state. The first antenna state assigns a radio path, used for location estimation, to a first antenna of the antenna array. Subsequent to identifying a first midamble of the data payload, the first wireless device may change the first antenna state to a second antenna state. The second antenna state assigns the radio path to a second antenna of the antenna array. The first wireless device may receive one or more second data symbols of the data payload from the second wireless device using the second antenna state. The first wireless device may determine a location of the second wireless device based on location information determined using the radio path.

Illustratively, the techniques described herein may be performed by hardware, software, and/or firmware, such as in accordance with the location tracking process 248, which may include computer executable instructions executed by the processor 220 (or independent processor of interfaces 210) to perform functions relating to the techniques described herein, on either or both of the AP or the devices/nodes (or client devices), as detailed below.

Figure 3A:
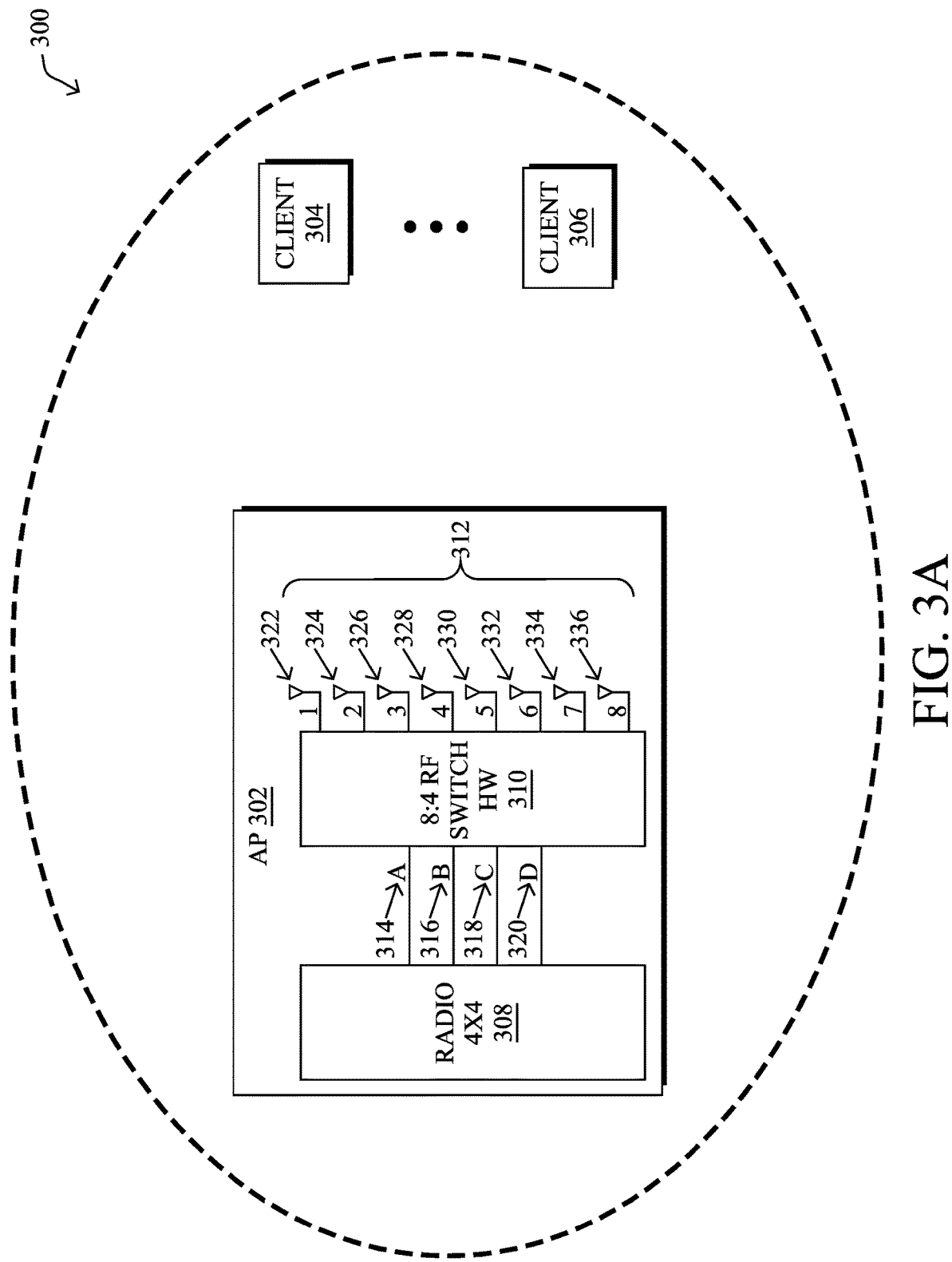
FIGS. 3A-3D illustrate a simplified example wireless network that implements Internet of Things (IoT) device location tracking using midambles.

Operationally, consider the example wireless network 300 shown in FIGS. 3A-3D that includes a includes an access point (AP) 302 that services a plurality of client devices (e.g., IoT devices, stations, etc.) 304-306. As shown in FIG. 3A, the AP may include a radio 308 that is in connection with an antenna switch 310, where the antenna switch 310 is connected to an antenna array 312. The antenna array includes a plurality of antennas (e.g., 322-336).

With more detail regarding the antenna switch 310 and the antenna array 312, location estimation techniques (e.g., AoA location, RSSI location, etc.) conventionally require multiple antennas that are configured to capture RF and/or BB signals to accurately locate other wireless devices. Typically, a device may include more antennas than radio paths (e.g., Rx chains). As shown in FIG. 3A, the radio may comprise four radio paths 314-320 and eight antennas 322-336. In a conventional system, a radio path 314 may be permanently assigned to a first antenna 322, while other radio paths 316-320 are assigned to other antennas 324-336 over a plurality of antenna switch states (e.g., a second radio path may be assigned to a second antenna 324, a third radio path may be assigned to a third antenna 326, and a fourth radio path 320 may be assigned to a fourth antenna 328). In the conventional system, if an assignment of a radio path to an antenna switches during the reception of a packet (e.g., a data payload), only the radio path 314 that is assigned the antenna 322 may be used to receive the packet because the other radio paths would undergo drastic channel estimation change while receiving the packet (thus, making the signal-to-noise (SNR) ratio very poor). Permanently assigning the radio path 314 to the first antenna 322 (a) limits the conventional system in that it can decode only a single spatial stream (e.g., a lower data rate) for the data payload, (b) limits the AP so that it can only decode one data stream instead of multiple data streams, and (c) removes the possibility of using Rx diversity to decode spatial stream packets for Rx robustness. Alternatively, permanently assigning a plurality of radio paths (e.g., radio paths 314-316) to a plurality of antennas (e.g., antenna 322-324) during the reception of the data payload requires multiple data payloads for sounding of the antennas (that would be pose additional problems for power-limited IoT devices).

Figure 3B:
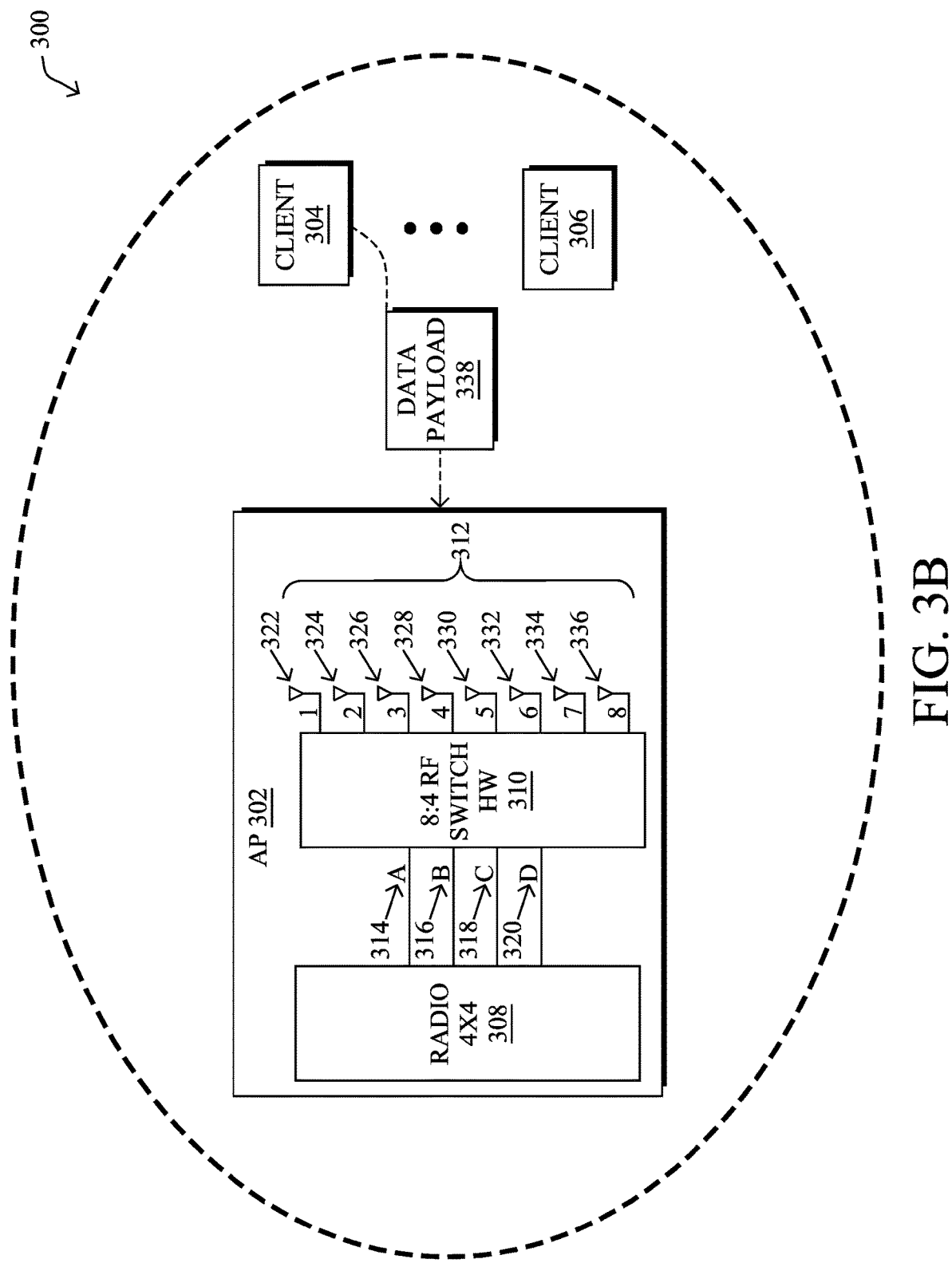
Figure 4:
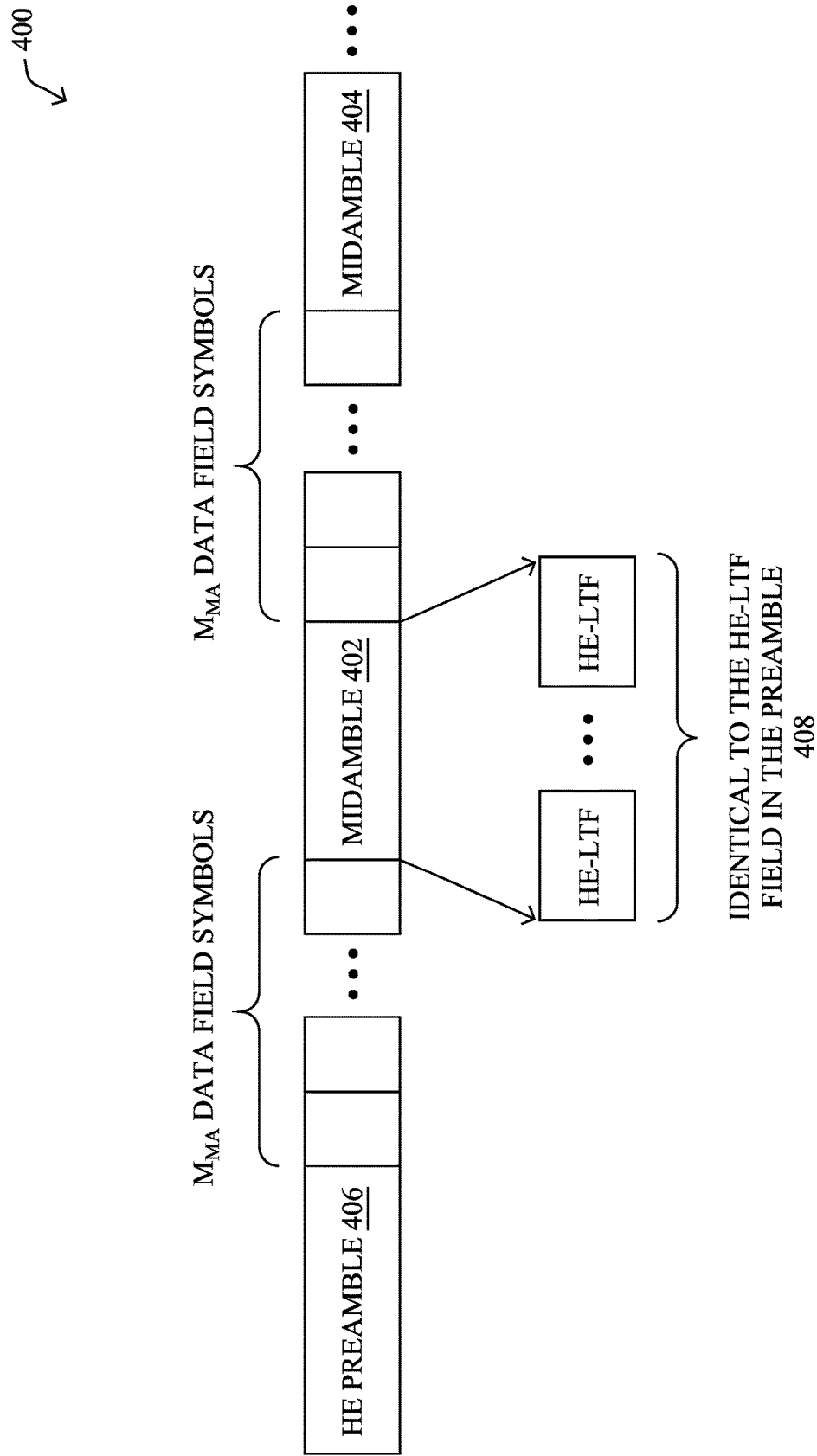
FIG. 4 illustrates a simplified example data payload that includes a midamble.

Turning to FIG. 3B, the AP 302, according to the techniques described herein, may be configured to intermittently perform channel estimation through reception of a data payload 338 from a client device 304. In particular, one or more of the radio paths 314-320 may be switched among antenna states, while still allowing for decoding of the data payload 338. Therefore, a permanent assignment of a radio path to an antenna, as described with respect to conventional system above, is no longer required. Instead, the radio paths 314 may each be switched to different antennas 322-336 when a midamble of data payload 338 is decoded. In particular, and with reference to FIG. 4, a simplified example data payload is shown, where the data payload may comprise a HE PPDU 400, as defined in IEEE 802.11ax. The HE PPDU 400 may include a plurality of midambles 402-404, where the midambles 402-404 are repeats 408 of a high efficiency long training field (HE-LTF) found in a preamble 406 of the HE PPDU 400. The midambles 402-404 may be inserted into the HE PPDU 400, for example, every 10 or every 20 orthogonal frequency-division multiplexing (OFDM) data symbols. When a device (e.g., the AP 302) performs equalizing of any data symbol in the PPDU 400, the equalizing is based on a channel estimate from a most recently processed midamble. Accordingly, at any midamble, the device refreshes its calculation of the channel. Doing so allows the device to support drastic changes to a transmission channel, introduced at a midamble boundary, to which the receiver will be robust.

Returning to FIG. 3B, the AP 302 may be configured to switch among antenna states at the decoding of a midamble of the data payload 338. In particular, the antenna switch 310 may comprise an RF switch connected to the antenna array 310 that can switch any of the radio paths 314-320 to a particular antenna of the plurality of antennas 312. The RF switch may include general purpose input/output (GPIO). The RF switch may further include "hooks" in the BB and/or physical layer (PHY) to trigger and/or schedule switching of the antenna states at the decoding of a midamble. The radio 308 may include a software defined radio, for example, a continuous wave (CW) radio. Further, it is to be understood that switching among antenna states may be performed during a cyclic prefix of a HE-LTF. In situations where additional time may be required, channel estimation performed by the AP 302 may be configured to ignore, for example, a HE-LTF and use full symbols as guard interval(s) for settling time (for switching of antennas states).

Switching among the antenna states enables the AP 302 to capture RF and/or location information used for accurate location estimation. Notably, the AP 302 may determine a location of the client device 304. In particular, the AP 302, for each of the antenna states, may estimate a phase used for AoA location estimation of the client device 304. Switching among the antenna states allows sounding of the full antenna array 312 with fewer data payloads at higher data rates and/or more robust decoding via Rx diversity gain. The AP 302 may, alternatively, compute a Rx TOA timestamp for time-based location estimation (e.g., time of flight (ToF)) of the client device 304. Switching among the antenna states allows for Rx robustness. The AP may average a RSSI indicator over the antenna array 312 and extract common line-of-sight (LOS) component(s) of the client device 304. It is to be understood that, for AoA location estimation-based system, at least one radio path that is permanently assigned to an antenna may be required.

Figure 3C:
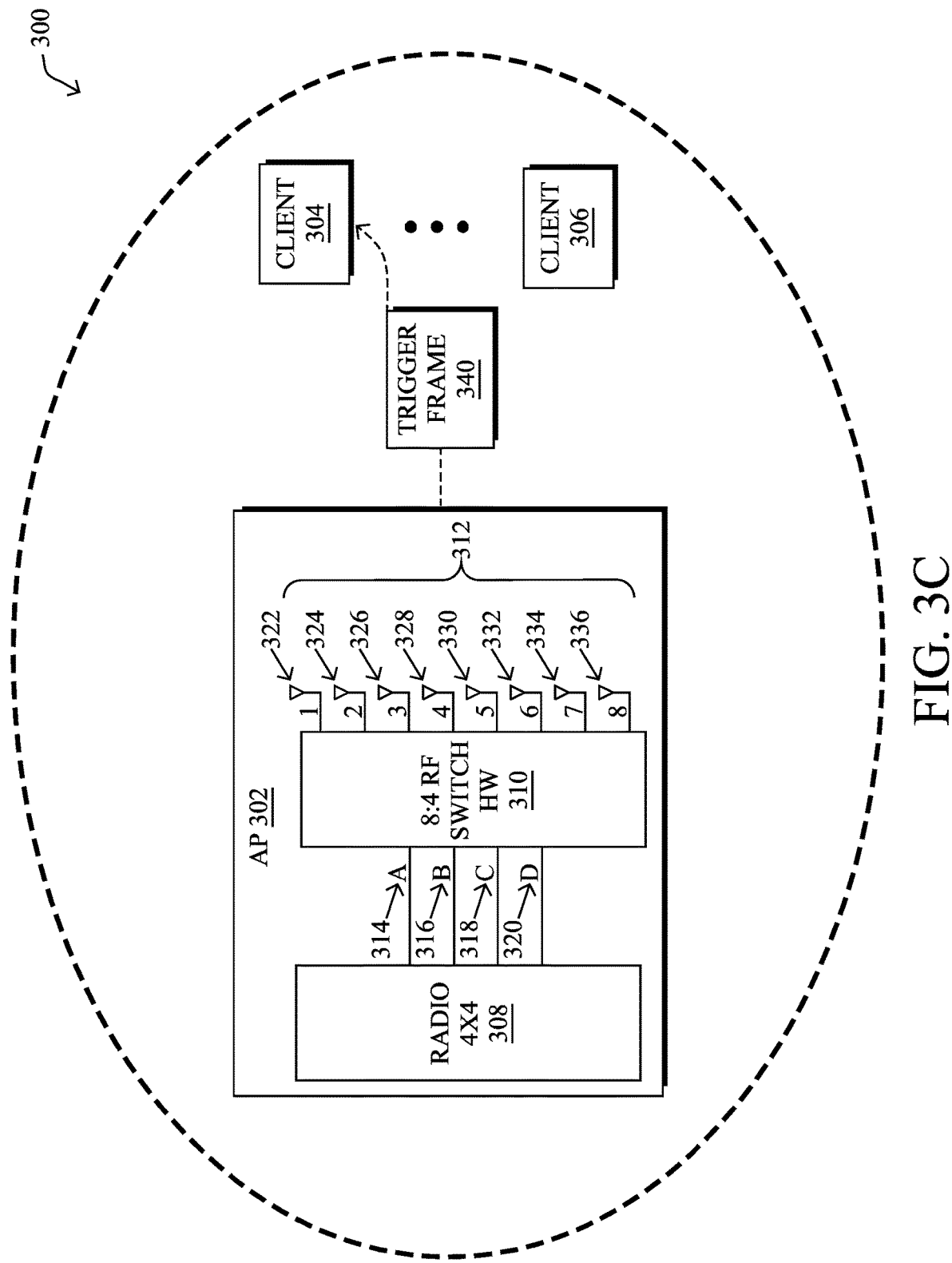

In addition, with reference to FIG. 3C, the AP 302 may be configured to send a trigger frame 340 to the client device 304, where the trigger frame 340 causes the client device 304 to send the data payload 338 (including midamble(s)). The trigger frame 340 may indicate a frequency of insertion of midambles into the data payload 338. The frequency of insertion may be based on, for example, a number of spatial streams supported by the AP 302 (e.g., the fewer spatial streams the AP 302 supports, the fewer midambles are needed to switch). It is to be understood that the frequency of insertion may be optimally selected as to minimize wasteful use of airtime and/or battery life of the client device 304. The AP 302 may be configured to send the trigger frame 340 when the AP 302 makes a determination to perform location tracking of the client device 304.

Figure 3D:
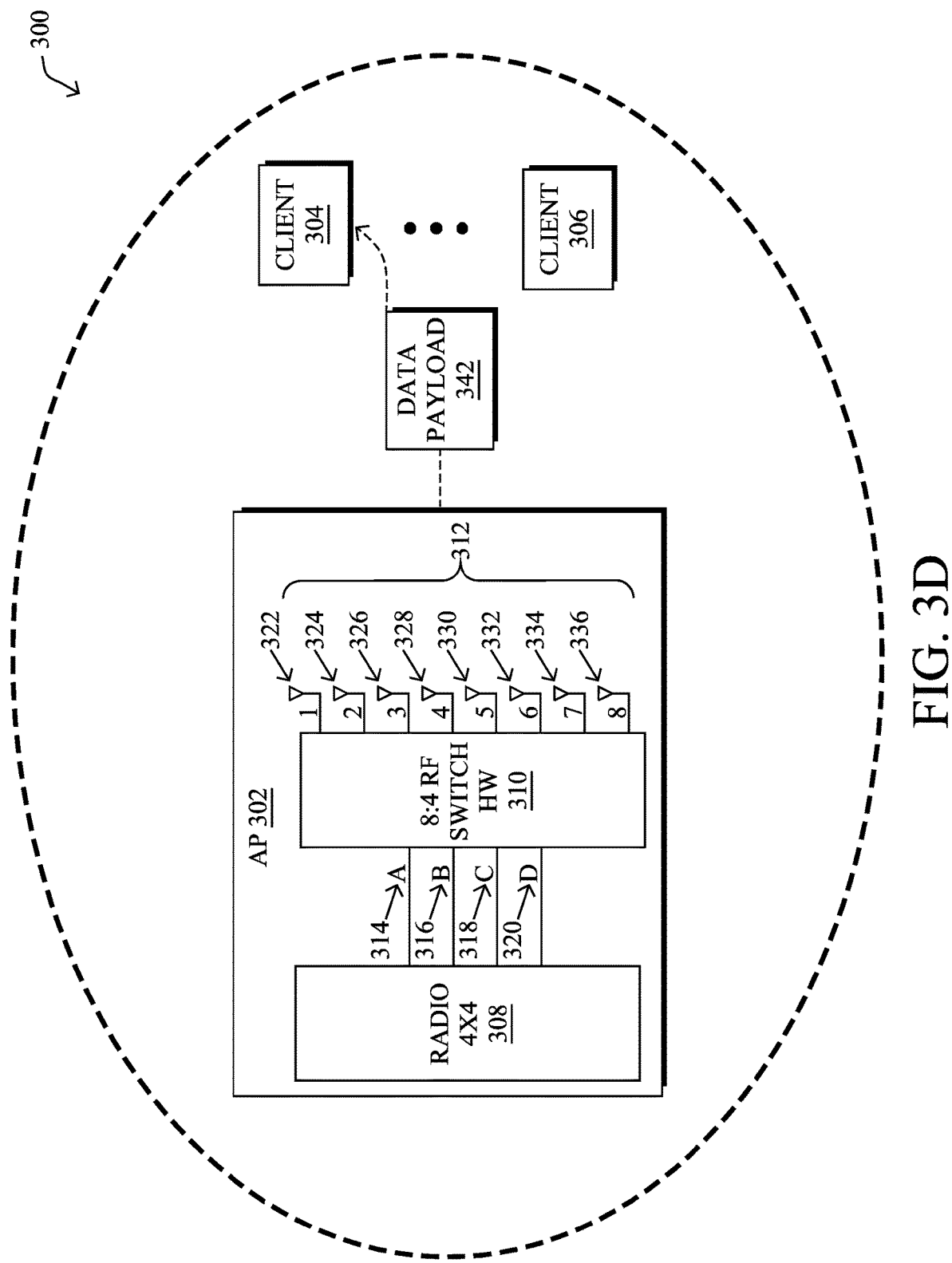

It is to be understood that the client device 304 may also perform client-side location estimation, as shown in FIG. 3D. In particular, the client device 304 may, as described above herein, be configured to receive a data payload 342 (e.g., a downlink PPDU) that includes midamble(s). In such system, the AP 302 may be configured to switch transmit (Tx) antenna states when sending the data payload 342 at midambles, while the client device 304 uses one Rx antenna state to receive the data payload 342. Consequently, the client data device may acquire and/or determine location information, where the location information can be used by the client device 304 to estimate its own location (e.g., by using any of the location estimation techniques described herein).

Figure 5:
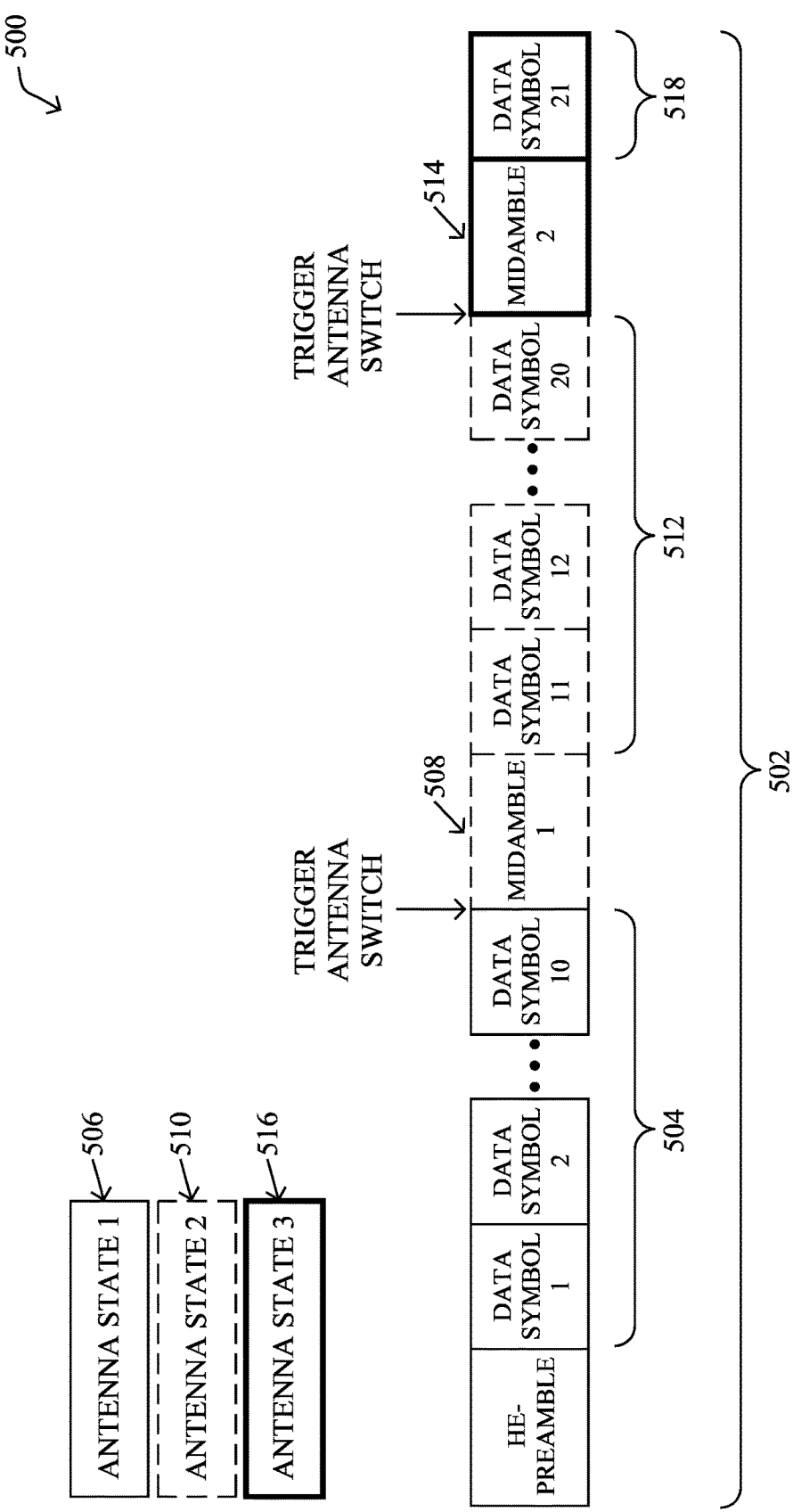
FIG. 5 illustrates a simplified example decoding flow of a device switching among antenna states.

With reference now to FIG. 5, a simplified example 500 of a simplified example decoding flow of a device switching among antenna states during the reception of a data payload 502 is shown. In particular, a wireless device, when receiving a data payload 502, may be configured to receive first data symbols 504 using a first antenna state 506. The wireless device, upon identifying a first midamble 508, may change the first antenna state 506 to a second antenna state 510. The device may decode second data symbols 512 using the second antenna state 510. The wireless device, upon identifying a second midamble 514, may change the second antenna state 510 to a third antenna state 516. The device may decode third data symbols 518 using the second antenna state 516. The wireless device, as shown, may decode the data symbols 504, 512, 518 may using a same channel weight.

Turning to FIGS. 6A-6B, simplified example antenna states are shown. In FIG. 6A, at a first midamble 600, a first antenna state 602 may assign a first radio path 604, a second radio path 606, a third radio path 608, and a fourth radio path 610, respectively, to a plurality of different antenna 612 of an antenna array. At a second midamble 614, a second antenna state 616 may assign the first radio path 604, the second radio path 606, the third radio path 608, and the fourth radio path 610, respectively, to a different plurality of different antenna of an antenna array. In the example shown in FIG. 6A, a wireless device, which implements switching of antenna states upon identification of the midambles 600, 614, may decode up to four spatial stream data payloads (e.g., PPDUs) and has four radio paths of RX diversity for location estimation techniques.

With reference to FIG. 6B, an example of antenna states where two radio paths 620 are static over a given midamble and two other radio paths 622 allow frequent switching of antennas of an antenna array is shown. In particular, as shown, a client device may send one spatial stream (of a data payload) over the two radio paths 620 worth of Rx diversity to an AP. This allows the receiving AP to robustly decode the spatial stream. The two other radio paths 622 may be used for sounding with frequent switching of the radio paths among antennas. Accordingly, in the example shown in FIG. 6B, a wireless device may decode up to two spatial stream data payloads (e.g., PPDUs) and may have two radio paths of RX diversity for location estimation techniques.

Figure 7:
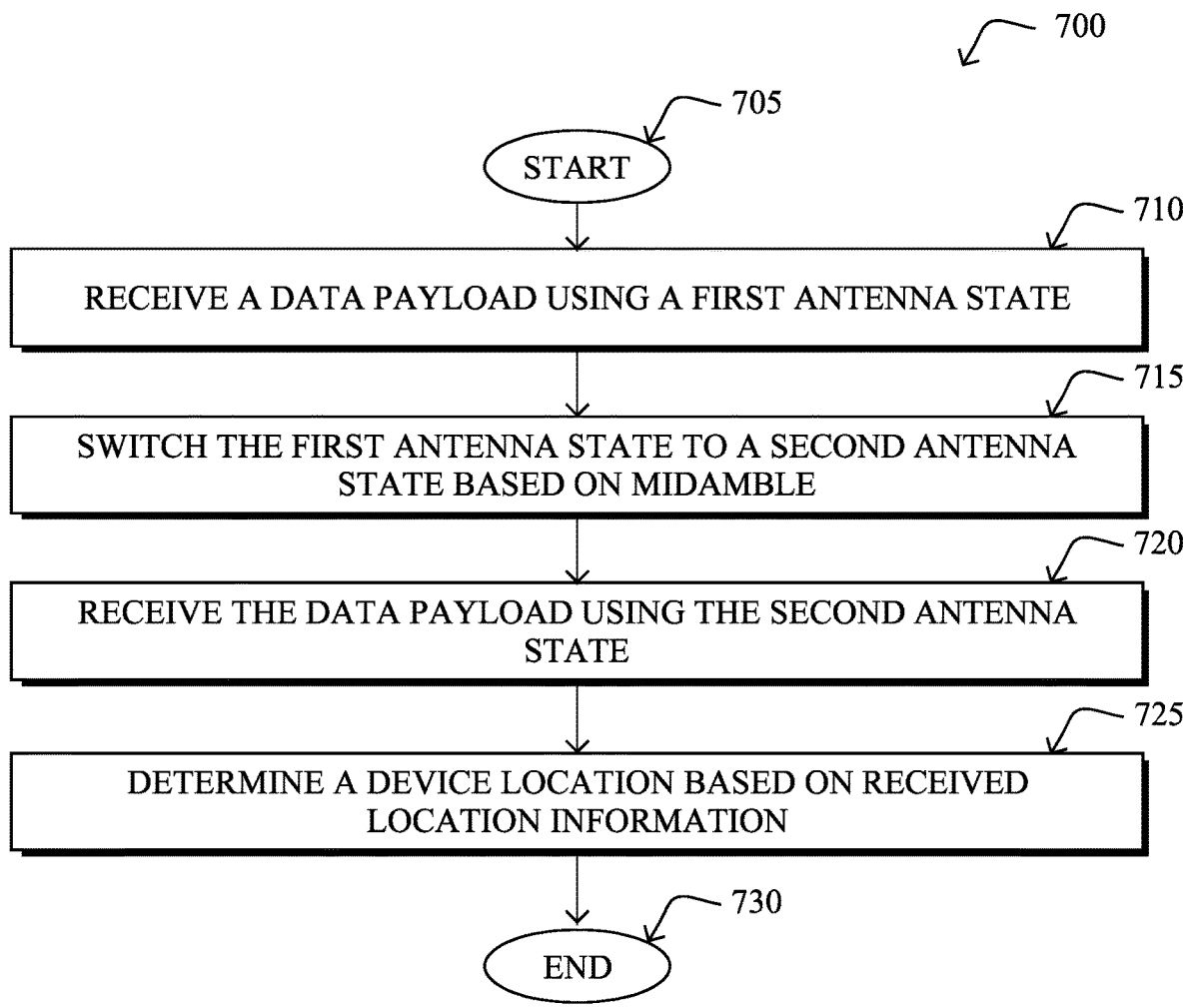
FIG. 7 illustrates an example simplified procedure for IoT device location tracking using midambles.

FIG. 7 illustrates an example simplified procedure for performing improved IoT device location tracking using midambles in accordance with one or more embodiments described herein. For example, a non-generic, specifically configured device (e.g., device 200, an apparatus, etc.) may perform procedure 700 by executing stored instructions (e.g., process 248). The procedure may start at step 705, and continues to step 710, where, as described in greater detail above, a device may receive a data payload using a first antenna state. In particular, a first wireless device, in connection with an antenna array, may receive one or more first data symbols of a data payload from a second wireless device using a first antenna state, the first antenna state assigning a radio path that is used for location estimation to a first antenna of the antenna array. The first wireless device may send a trigger frame to the second wireless device, the trigger frame configuring a frequency of insertion of midambles into the data payload. The frequency of insertion may be based on a number of spatial streams supported by the first wireless device. The data payload data payload may comprise a HE PPDU.

In step 715, the device may switch the first antenna state to a second antenna state based on midamble. In particular, the first wireless device may the first antenna state to a second antenna state subsequent to identifying a first midamble of the data payload, the second antenna state assigning the radio path to a second antenna of the antenna array.

The first wireless device may use a RF switch connected to the antenna array to switch the radio path from the first antenna to the second antenna, the RF switch including GPIO. The first antenna state and the second antenna state may assign a different radio path to an antenna different than the first antenna and the second antenna, the different radio path used for sounding with the second wireless device.

In step 720, the device may receive the data payload using the second antenna state. In particular, the first wireless device may receive one or more second data symbols of the data payload from the second wireless device using the second antenna state. The first wireless device may comprise an AP and the second wireless device may comprise an IoT device associated with the AP. Alternatively, the first wireless device may comprise an IoT device associated with an AP and the second wireless device may comprise the AP.

In step 725, the device may determine a device location based on received location information. In particular, the first wireless device may determine a location of the second wireless device based on location information determined using the radio path. The wireless device, when determining the location of the second wireless device, may implement a location estimation technique, the location estimation technique selected from the group consisting of: angle of arrival (AoA) location estimation, time of flight (ToF) location estimation, and received signal strength indicator (RSSI) location estimation.

The simplified example procedure 700 then ends at step 730.

It should be noted that certain steps within procedure 700 may be optional as described above, and the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for improved IoT device (e.g., sensors, mobile devices, alarms, actuators, or the like), location tracking using midambles. In some aspects, midambles (e.g., of a wireless protocol standard like IEEE 802.11ax) may be used to improve location accuracy, latency, update rates, and/or battery life for wireless devices. In particular, the midambles may be used to enable switching of radio paths of an antenna array during the reception of a data payload. Switching among antenna states (that assign radio paths to particular antennas of the antenna array) enables capture of RF and/or BB location information used for accurate location estimation. Doing so enables Rx diversity and preservation of Rx robustness for location estimation (or tracking) techniques, especially in situations where a receiving device has more antennas than radio paths (for receiving the data payload).

While there have been shown and described illustrative embodiments that provide for improved IoT device location tracking using midambles, it is to be understood that various other adaptations and modifications may be made within the scope of the embodiments herein. In addition, while certain protocols are shown, like 802.11ax, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true scope of the embodiments herein.

What is claimed is:

1. A method, comprising:
   receiving, by a first wireless device in connection with an antenna array, one or more first data symbols of a data payload from a second wireless device using a first antenna state, the first antenna state assigning a radio path that is used for location estimation to a first antenna of the antenna array;
   changing, by the first wireless device, the first antenna state to a second antenna state subsequent to identifying a first midamble of the data payload, the second antenna state assigning the radio path to a second antenna of the antenna array;
   receiving, by the first wireless device, one or more second data symbols of the data payload from the second wireless device using the second antenna state; and
   determining, by the first wireless device, a location of the second wireless device based on location information determined using the radio path.

2. The method of claim 1, further comprising:
   sending, by the first wireless device, a trigger frame to the second wireless device, the trigger frame configuring a frequency of insertion of midambles into the data payload.

3. The method of claim 2, wherein the frequency of insertion is based on a number of spatial streams supported by the first wireless device.

4. The method of claim 1, wherein the first antenna state and the second antenna state assign a different radio path to an antenna different than the first antenna and the second antenna, the different radio path used for sounding with the second wireless device.

5. The method of claim 1, wherein changing, by the first wireless device, the first antenna state to the second antenna state comprises:
   using, by the first wireless device, a radio frequency (RF) switch connected to the antenna array to switch the radio path from the first antenna to the second antenna, the RF switch including general purpose input/output (GPIO).

6. The method of claim 1, wherein determining, by the first wireless device, the location of the second wireless device based on location information determined using the radio path comprises:
   implementing a location estimation technique, the location estimation technique selected from the group consisting of: angle of arrival (AoA) location estimation, time of flight (ToF) location estimation, and received signal strength indicator (RSSI) location estimation.

7. The method of claim 1, further comprising:
   changing, by the first wireless device, the second antenna state to a third antenna state subsequent to identifying a second midamble of the data payload, the third antenna state assigning the radio path to a third antenna of the antenna array; and
   receiving, by the first wireless device, one or more third data symbols of the data payload from the second wireless device using the third antenna state.

8. The method of claim 1, wherein the data payload comprises a high efficiency (HE) physical layer (PHY) protocol data unit (PPDU).

9. The method of claim 1, wherein the first wireless device comprises an access point (AP) and the second wireless device comprises an Internet of Things (IoT) device associated with the AP.

10. The method of claim 1, wherein the first wireless device comprises an Internet of Things (IoT) device associated with an access point (AP) and the second wireless device comprises the AP.

11. An apparatus, comprising:
    one or more network interfaces to communicate with a network, the one or more network interfaces including an antenna array;
    a processor coupled to the network interfaces and configured to execute one or more processes; and
    a memory configured to store a process executable by the processor, the process, when executed, is configured to:
       receive one or more first data symbols of a data payload from a wireless device using a first antenna state, the first antenna state assigning a radio path that is used for location estimation to a first antenna of the antenna array;
       change the first antenna state to a second antenna state subsequent to identifying a first midamble of the data payload, the second antenna state assigning the radio path to a second antenna of the antenna array;
       receive one or more second data symbols of the data payload from the wireless device using the second antenna state; and determine a location of the wireless device based on location information determined using the radio path.

12. The apparatus as in claim 11, wherein the process, when executed, is further configured to:
send a trigger frame to the wireless device, the trigger frame configuring a frequency of insertion of midambles into the data payload.

13. The apparatus as in claim 12, wherein the frequency of insertion is based on a number of spatial streams supported by the first wireless device.

14. The apparatus as in claim 11, wherein the first antenna state and the second antenna state assign a different radio path to an antenna different than the first antenna and the second antenna, the different radio path used for sounding with the wireless device.

15. The apparatus as in claim 11, wherein the process, when executed to change the first antenna state to the second antenna state, is further configured to:
use a radio frequency (RF) switch connected to the antenna array to switch the radio path from the first antenna to the second antenna, the RF switch including general purpose input/output (GPIO).

16. The apparatus as in claim 11, wherein the process, when executed to determine the location of the wireless device based on location information determined using the radio path, is further configured to:
implement a location estimation technique, the location estimation technique selected from the group consisting of: angle of arrival (AoA) location estimation, time of flight (ToF) location estimation, and received signal strength indicator (RSSI) location estimation.

17. The apparatus as in claim 11, wherein the data payload comprises a high efficiency (HE) physical layer (PHY) protocol data unit (PPDU).

18. The apparatus as in claim 11, wherein the apparatus comprises an access point (AP) and the wireless device comprises an Internet of Things (IoT) device associated with the AP.

19. The apparatus as in claim 11, wherein the apparatus comprises an Internet of Things (IoT) device associated with an access point (AP) and the wireless device comprises the AP.

20. A tangible, non-transitory, computer-readable medium storing program instructions executable by a processor, wherein the program instructions cause a first wireless device in connection with an antenna array to execute a process comprising:
receiving one or more first data symbols of a data payload front a second wireless device using a first antenna state, the first antenna state assigning a radio path that is used for location estimation to a first antenna of the antenna array;
changing the first antenna state to a second antenna state subsequent to identifying a first midamble of the data payload, the second antenna state assigning the radio path to a second antenna of the antenna array;
receiving one or more second data symbols of the data payload from the second wireless device using the second antenna state; and
determining a location of the second wireless device based on location information determined using the radio path.

* * * * *

UNITED STATES PATENT AND TRADEMARK OFFICE
CERTIFICATE OF CORRECTION

PATENT NO. : 10,873,947 B2
APPLICATION NO. : 16/287388
DATED : December 22, 2020
INVENTOR(S) : Matthew Silverman et al.

Page 1 of 1

It is certified that error appears in the above-identified patent and that said Letters Patent is hereby corrected as shown below:

In the Claims

Column 14, Line 18, Claim 20: please amend as shown:
from a second wireless device using a first antenna Signed and Sealed this
Second Day of March, 2021

Drew Hirshfeld
*Performing the Functions and Duties of the*
*Under Secretary of Commerce for Intellectual Property and*
*Director of the United States Patent and Trademark Office*